US012003054B2

(12) United States Patent
Stack

(10) Patent No.: US 12,003,054 B2
(45) Date of Patent: Jun. 4, 2024

(54) TERMINAL SYSTEM OF A CONNECTOR SYSTEM

(71) Applicant: TE Connectivity Services GmbH, Schaffhausen (CH)

(72) Inventor: Daniel Stack, Winston Salem, NC (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 262 days.

(21) Appl. No.: 17/368,277

(22) Filed: Jul. 6, 2021

(65) Prior Publication Data

US 2023/0012270 A1 Jan. 12, 2023

(51) Int. Cl.
*H01R 13/434* (2006.01)
*H01R 13/506* (2006.01)

(52) U.S. Cl.
CPC ......... *H01R 13/434* (2013.01); *H01R 13/506* (2013.01)

(58) Field of Classification Search
CPC .. H01R 13/434; H01R 13/506; H01R 13/627; H01R 13/20; H01R 13/6582; H01R 13/639; H01R 24/005; H01R 13/02; H01R 13/502
See application file for complete search history.

(56) References Cited

U.S. PATENT DOCUMENTS 10,490,937 B1 * 11/2019 Su .......................... H01R 24/64

* cited by examiner

*Primary Examiner* — Briggitte R. Hammond

(57) ABSTRACT

A terminal system includes a first terminal assembly, a sleeve disposed around the first terminal assembly, and a second terminal assembly matable with the first terminal assembly along a longitudinal direction. The sleeve is movable with respect to the first terminal assembly from an insertion position to an end position along the longitudinal direction toward the second terminal assembly while the first terminal assembly remains stationary in a mated position with the second terminal assembly.

20 Claims, 13 Drawing Sheets

TERMINAL SYSTEM OF A CONNECTOR SYSTEM

FIELD OF THE INVENTION

The present invention relates to a terminal system and, more particularly, to a terminal system including a first terminal assembly matable with a second terminal assembly.

BACKGROUND

In connector systems in which a harness assembly is matable with another harness assembly, an air gap is often present in a mated state at an interface between terminal assemblies of the mated harness assemblies. The size of the air gap significantly impacts performance of the terminal system including the terminal assemblies. Current efforts to increase performance of the terminal system, for example by transmitting higher data speeds, and to minimize the size of the terminal system result in a smaller tolerance allowance for the size of the air gap.

In present connector systems, each of the harness assemblies has tolerance ranges for a number of different parts that comprise the harness assembly. For example, within the terminal assembly, a dimension of a contact end to a latching point of the contact is subject to a tolerance. A position of the terminal assembly within an outer housing of the harness assembly is subject to a separate tolerance. When the harness assemblies are mated, the tolerances for each of the various parts added together dictate the potential size of the air gap; when a multitude of different tolerances are present in the connector system, it is difficult and unreliable to meet the small tolerance allowance for the size of the air gap.

SUMMARY

A terminal system includes a first terminal assembly, a sleeve disposed around the first terminal assembly, and a second terminal assembly matable with the first terminal assembly along a longitudinal direction. The sleeve is movable with respect to the first terminal assembly from an insertion position to an end position along the longitudinal direction toward the second terminal assembly while the first terminal assembly remains stationary in a mated position with the second terminal assembly.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
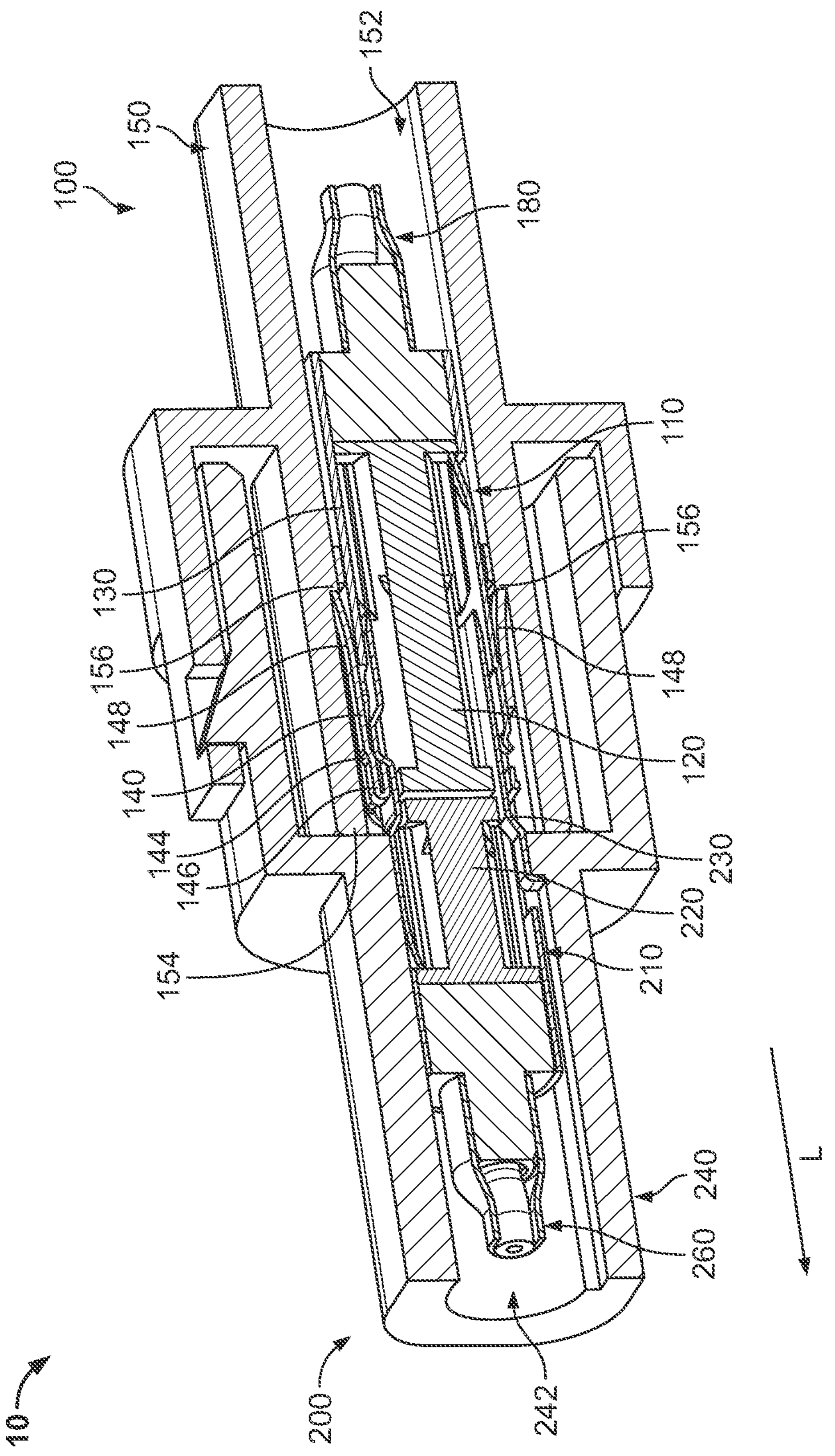
FIG. 1 is a sectional perspective view of a connector system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

A connector system 10 according to an embodiment, as shown in FIG. 1, comprises a first harness assembly 100 and a second harness assembly 200 matable with the first harness assembly 100.

Figure 2:
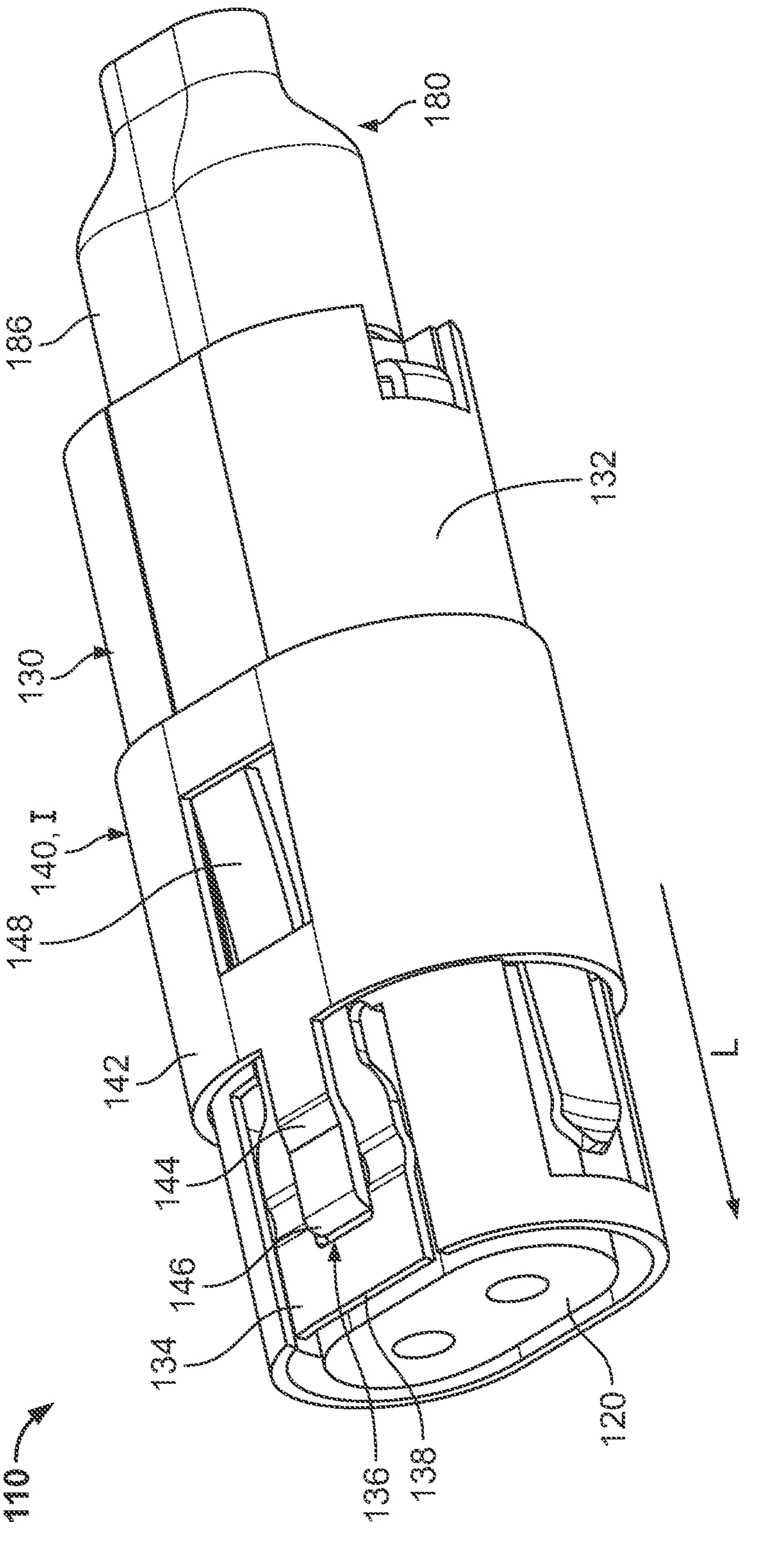
FIG. 2 is a perspective view of a first terminal assembly of a first harness assembly of the connector system.
Figure 3:
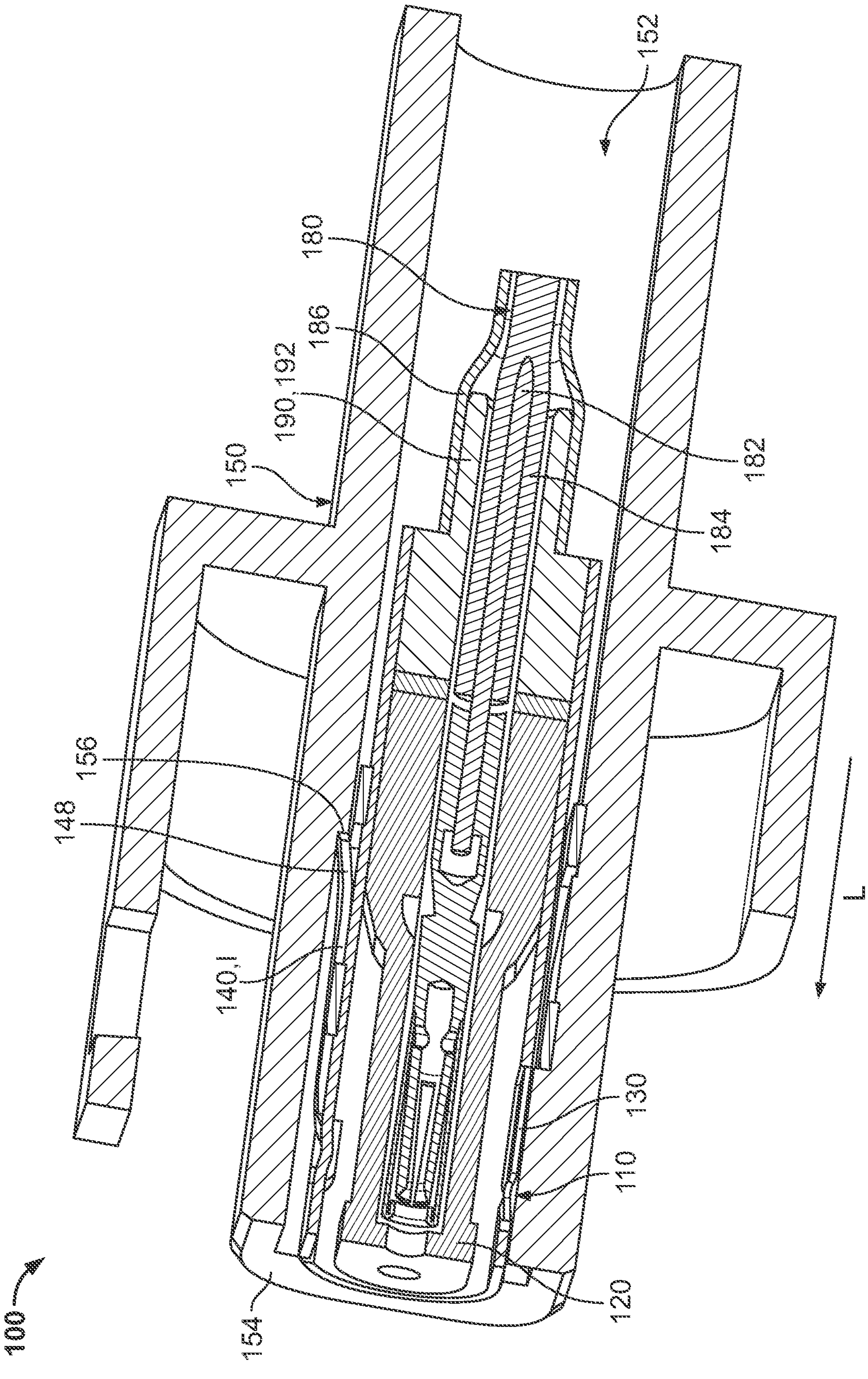
FIG. 3 is a sectional perspective view of the first harness assembly.

The first harness assembly 100, as shown in FIGS. 1-3, includes a first terminal assembly 110, a sleeve 140 disposed around the first terminal assembly 110, and a first outer housing 150 in which the first terminal assembly 110 and the sleeve 140 are disposed.

The first terminal assembly 110, as shown in FIGS. 1-3, includes a first inner housing 120 and a first outer contact 130 disposed around the first inner housing 120. The first inner housing 120 is formed of an insulative material, such as a plastic. The first outer contact 130, as shown in FIG. 2, has a first outer contact body 132 and an outer contact beam 134 extending from the first outer contact body 132 along a longitudinal direction L of the first terminal assembly 110. The first outer contact 130 is formed of a conductive material, such as a copper alloy, aluminum or another metal. In the shown embodiment, the first outer contact 130 is monolithically formed in a single piece from a stamped and bent sheet of metal. In other embodiments, the first outer contact 130 could be formed of other conductive materials and could be assembled from a plurality of separately formed pieces.

As shown in FIG. 2, the outer contact beam 134 has an engagement passageway 136 extending through the outer contact beam 134 in a direction perpendicular to the longitudinal direction L. The outer contact beam 134 extends from the first outer contact body 132 to a free end 138 opposite the first outer contact body 132 in the longitudinal direction L; the outer contact beam 134 is cantilevered from and resiliently deflectable with respect to the first outer contact body 132.

The sleeve 140, as shown in FIG. 2, has a sleeve body 142 and a sleeve beam 144 extending from the sleeve body 142 in the longitudinal direction L. The sleeve beam 144 is resiliently deflectable with respect to the sleeve body 142. The sleeve beam 144 has a catch 146 disposed on an end of the sleeve beam 144 opposite the sleeve body 142 in the longitudinal direction L. The sleeve 140 has a latching arm 148 extending from the sleeve body 142 along the longitudinal direction L opposite the sleeve beam 144.

In the embodiment shown in FIGS. 1 and 2, the sleeve 140 has one sleeve beam 144 and two latching arms 148, the two latching arms 148 are disposed opposite one another around the sleeve 140. In other embodiments, the sleeve 140 could have more than one sleeve beam 144 and/or could have three or more latching arms 148, provided the sleeve beams 144 and latching arms 148 have the same functions as those described herein. In another embodiment, the sleeve 140 may not have any latching arms 148.

In various embodiments, the sleeve 140 may be formed from a conductive material, such as a steel, or from an insulative material, such as a plastic. In the shown embodiment, the sleeve 140 is monolithically formed in a single piece from the conductive material or the insulative material. In other embodiments, the sleeve 140 could be assembled from a plurality of separately formed pieces.

The first outer housing 150, as shown in FIGS. 1 and 3, has a first terminal assembly passageway 152 extending through the first outer housing 150 along the longitudinal direction L. The first outer housing 150 has a first mating end 154 in the longitudinal direction L and a latch 156 disposed within the first terminal assembly passageway 152 adjacent to the first mating end 154. In the shown embodiment, the latch 156 is a step in the first outer housing 150 formed by a widening of the first terminal assembly passageway 152. In other embodiments, the latch 156 may be any other type of latch 156 capable of releasably engaging the latching arm 148. In another embodiment in which the sleeve 140 does not have the latching arms 148, the first outer housing 150 may not have the latch 156. The first outer housing 150 is formed of an insulative material, such as plastic.

In the embodiment shown in FIGS. 5-8 and 10, the first outer housing 150 has a secondary locking passageway 158 extending through the first outer housing 150 in a direction perpendicular to the longitudinal direction L. The secondary locking passageway 158 communicates with the first terminal assembly passageway 152. In this embodiment, the first harness assembly 100 has a secondary lock 160 that is removably insertable into the secondary locking passageway 158.

Figure 5:
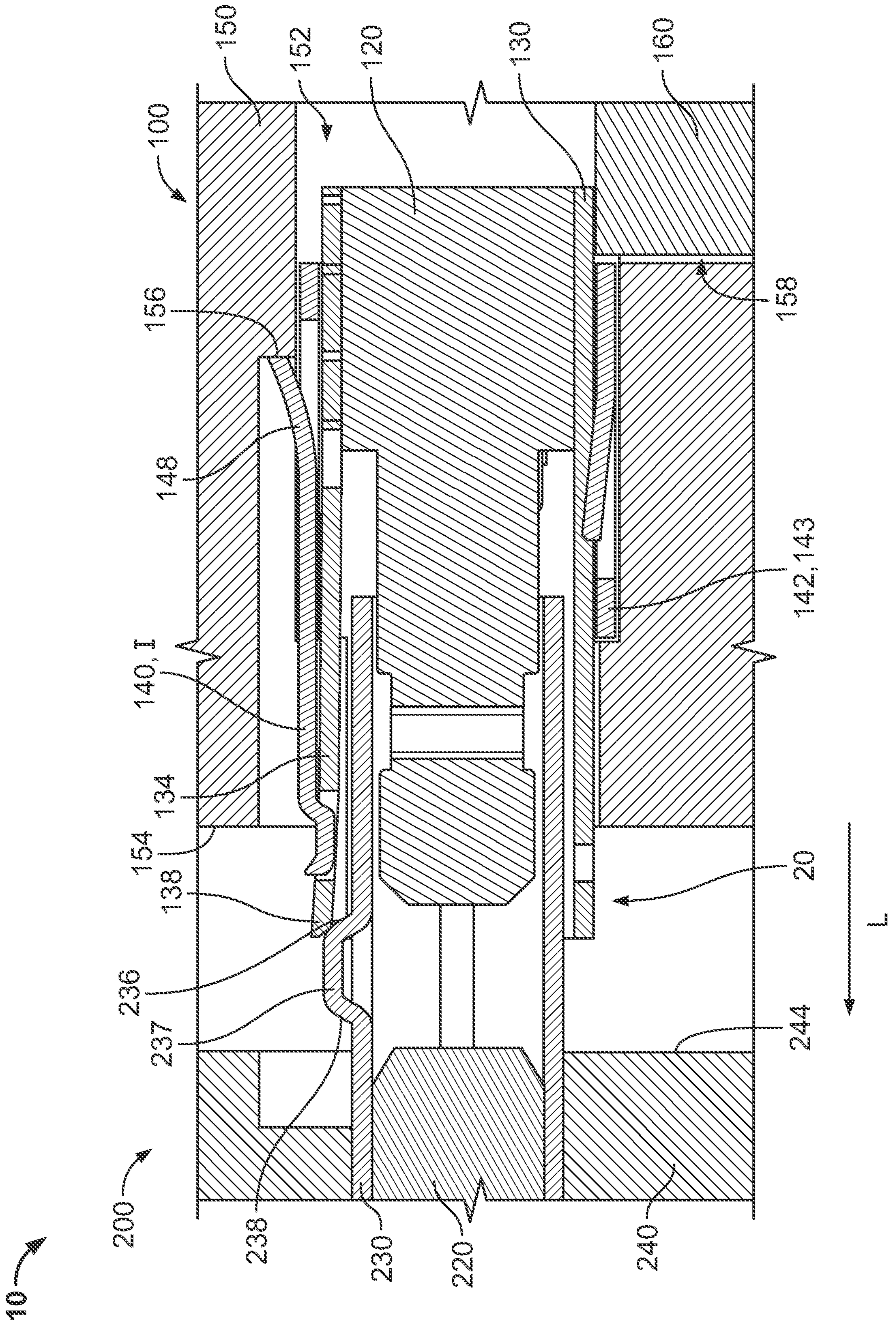
FIG. 5 is a sectional schematic detail of the first harness assembly and the second harness assembly with a sleeve in an insertion position and prior to mating of the first terminal assembly and a second terminal assembly of the second harness assembly.

The first harness assembly 100 is assembled as shown in FIGS. 2, 3, and 5.

As shown in FIG. 2, the sleeve 140 is positioned around the first terminal assembly 110 in an insertion position I. In the insertion position I, the catch 146 is engaged with the engagement passageway 136 of the outer contact beam 134 to secure the sleeve 140 with respect to the first terminal assembly 110 along the longitudinal direction L. The sleeve 140 remains fixed in the position shown in FIG. 2 along the first outer contact 130 in the longitudinal direction L while the catch 146 engages the engagement passageway 136.

With the sleeve 140 in the insertion position I, the first terminal assembly 110 and the sleeve 140 are positioned in the first outer housing 150, as shown in FIG. 3. The first terminal assembly 110 and the sleeve 140 are inserted into the first terminal assembly passageway 152 along the longitudinal direction L. The latching arm 148 of the sleeve 140 is deflected by contact with the first outer housing 150 in the first terminal assembly passageway 152 until the sleeve 140 reaches the latch 156, as shown in FIGS. 3 and 5, where the latching arm 148 elastically restores to engage the latch 156. The engagement of the latching arm 148 with the latch 156 secures the sleeve 140 to the first outer housing 150 opposite to the longitudinal direction L. In the embodiment shown in FIG. 5, a stopper 143 of the sleeve body 142 engages the first outer housing 150 to secure the sleeve 140 to the first outer housing 150 along the longitudinal direction L.

In other embodiments, the latching arm can be part of the first outer housing 150 and the latch engaging the latching arm can be part of the sleeve 140; the latching arm 148 and the latch 156 could be configured in any way that allows the sleeve 140 to be removably engaged with the first outer housing 150. In another embodiment in which the sleeve 140 does not have the latching arms 148 and the first outer housing 150 does not have the latch 156, the sleeve 140 can be secured in the first outer housing 150 with an adhesive material, or can be molded into the first outer housing 150. The sleeve 140 and the first terminal assembly 110 are positioned within the first terminal assembly passageway 152 adjacent to the first mating end 154, as shown in FIG. 3.

In the embodiment shown in FIG. 5, the secondary lock 160 is insertable into the secondary locking passageway 158 until it abuts the first outer contact 130 and is positioned adjacent to a rear of the sleeve 140 along the longitudinal direction L. The secondary lock 160 further secures the position of the sleeve 140 in the first outer housing 150 along the longitudinal direction L. In other embodiments, the secondary locking passageway 158 and the secondary lock 160 can be omitted.

As shown in FIG. 3, the first harness assembly 100 in an embodiment includes a first inner contact 170, a first cable 180 connected to the first inner contact 170, and a first connection assembly 190 securing the first cable 180 to the first terminal assembly 110. The first inner contact 170 is formed of a conductive material and is held in the first inner housing 120. In the shown embodiment, the first inner contact 170 is a socket contact. In other embodiments, the first inner contact 170 may be a pin contact or any other type of electrical contact.

The first cable 180, in the embodiment shown in FIG. 3, has a first conductor 182, a first insulation 184 disposed around the first conductor 182, and a first braid 186 disposed around the first insulation 184. The first conductor 182 is formed of a conductive material and, where the first insulation 184 is stripped from an end of the first conductor 182, the first conductor 182 is mechanically and electrically connected to the first inner contact 170 held in the first inner housing 120, for example by crimping or by any other mechanical and electrical securing of a conductor to a contact.

In the embodiment shown in FIGS. 2 and 3, the first cable 180 is a shielded twisted pair cable and includes a pair of first conductors 182, each with a first insulation 184, twisted around each other within a single first braid 186. In this embodiment, the first harness assembly 100 has two first inner contacts 170 held in the first inner housing 120, with each of the first conductors 182 connected to one of the first inner contacts 170. In other embodiments, the first cable 180 may have a single first conductor 182 with a single first insulation 184 and a single first braid 186, or may include a plurality of individual cables or shielded twisted pair cables, provided that each of the first conductors 182 is mechanically and electrically connected to one first inner contact 170 held in the first inner housing 120.

The first connection assembly 190 includes a first inner ferrule 192 disposed inside an end of the first outer contact 130 and adjacent to the first inner housing 120, as shown in FIG. 3. The first inner ferrule 192 is formed of a conductive material. The first conductor 182 and the first insulation 184 of the first cable 180 extend through the first inner ferrule 192 along the longitudinal direction L. The first braid 186 is positioned on an exterior of the first inner ferrule 192 outside of the first outer contact 130 and is electrically connected to the first inner ferrule 192.

Figure 4:
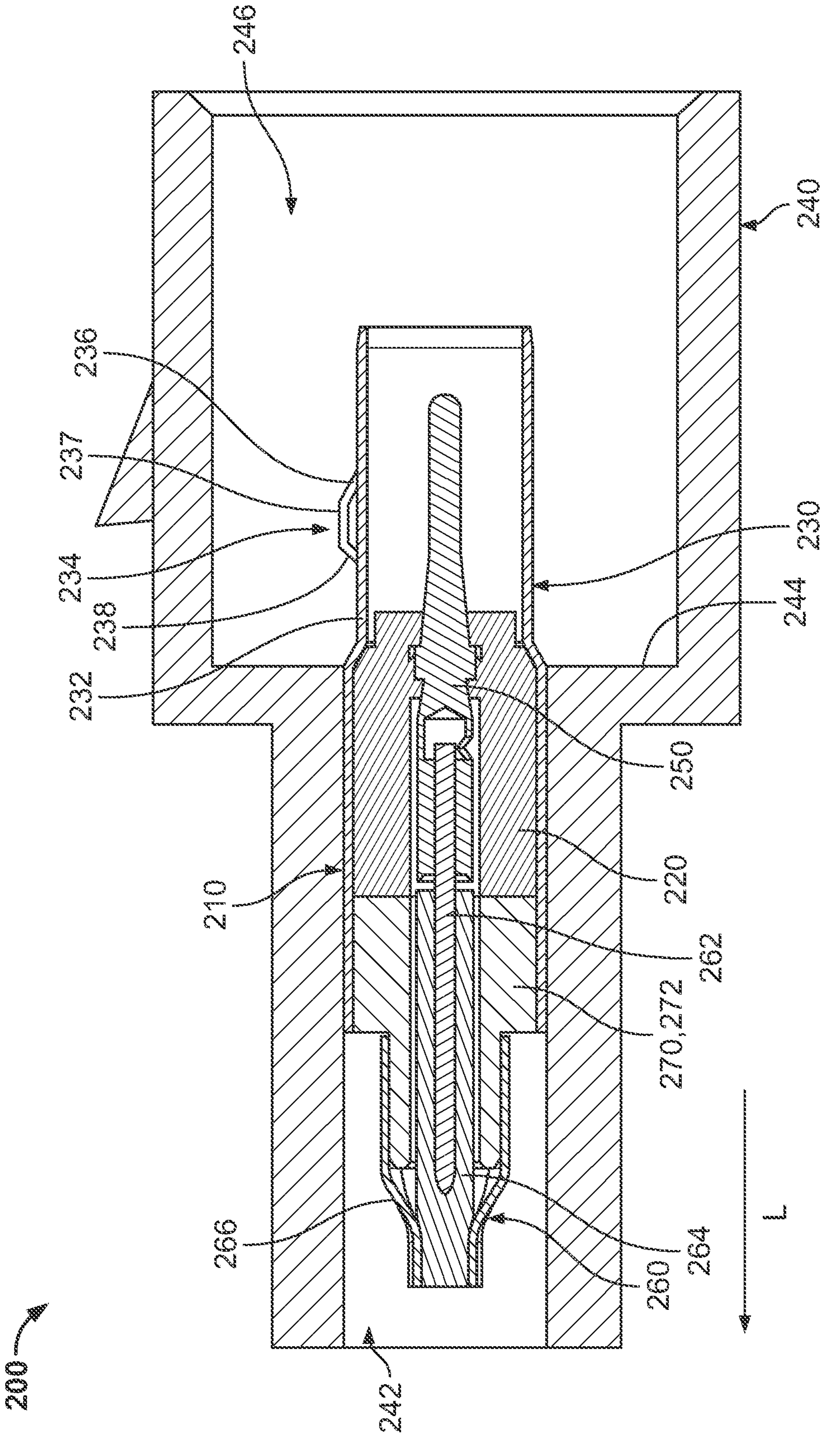
FIG. 4 is a sectional side view of a second harness assembly of the connector system.

The second harness assembly 200, as shown in FIGS. 1 and 4, includes a second terminal assembly 210 and a second outer housing 240 in which the second terminal assembly 210 is disposed.

The second terminal assembly 210, as shown in FIG. 4, includes a second inner housing 220 and a second outer contact 230 disposed around the second inner housing 220. The second inner housing 220 is formed of an insulative material, such as a plastic. The second outer contact 230 has a second outer contact body 232 and a protrusion 234 extending from the second outer contact body 232.

The protrusion 234 protrudes from the second outer contact body 232 in a direction perpendicular to the longitudinal direction L, as shown in FIG. 4. The protrusion 234 has a first slope 236, a central section 237, and a second slope 238 along the longitudinal direction L. The first slope 236 extends away from the second outer contact body 232 at an angle to the longitudinal direction L and connects to the central section 237. The central section 237 extends parallel to the longitudinal direction L in the shown embodiment. In other embodiments, the central section 237 could extend at an angle to the longitudinal direction L. The second slope 238 extends from an end of the central section 237 opposite the first slope 236 in the longitudinal direction L at an angle back toward the second outer contact body 232. In another embodiment, the central section 237 is omitted and the second slope 238 extends from an end of the first slope 236, forming the protrusion 234 as a triangular shape.

The second outer contact 230 is formed of a conductive material, such as a copper alloy, aluminum or another metal. In the shown embodiment, the second outer contact 230 is monolithically formed in a single piece from a stamped and bent sheet of metal. In various embodiments, the protrusion 234 can be punched or stamped and bent from the single piece of material. In other embodiments, the second outer contact 230 could be formed of other conductive materials and could be assembled from a plurality of separately formed pieces.

As shown in FIG. 4, the second outer housing 240 has a second terminal assembly passageway 242 extending through the second outer housing 240 along the longitudinal direction L. The second outer housing 240 has a second mating wall 244 in the longitudinal direction L and forms a receiving space 246 adapted to receive the first harness assembly 100 adjacent to the second mating wall 244. The second terminal assembly 210 is inserted into the second terminal assembly passageway 242 opposite to the longitudinal direction L and fixed in the second outer housing 240 in the position shown in FIG. 4; the protrusion 234 is disposed in the receiving space 246. The second terminal assembly 210 can be secured in the second outer housing 240 by latching, by an adhesive, or by any other type of attachment capable of securing the second terminal assembly 210 in the shown position in the second outer housing 240.

As shown in FIG. 4, the second harness assembly 200 in an embodiment includes a second inner contact 250, a second cable 260 connected to the second inner contact 250, and a second connection assembly 270 securing the second cable 260 to the second terminal assembly 210. The second inner contact 250 is formed of a conductive material and is held in the second inner housing 220. In the shown embodiment, the second inner contact 250 is a pin contact. In other embodiments, the second inner contact 250 may be a socket contact or any other type of electrical contact.

The second cable 260, in the embodiment shown in FIG. 4, has a second conductor 262, a second insulation 264 disposed around the second conductor 262, and a second braid 266 disposed around the second insulation 264. The second conductor 262 is formed of a conductive material and, where the second insulation 264 is stripped from an end of the second conductor 262, the second conductor 262 is mechanically and electrically connected to the second inner contact 250 held in the second inner housing 220, for example by crimping or by any other mechanical and electrical securing of a conductor to a contact.

In the embodiment shown in FIGS. 1 and 4, the second cable 260 is a shielded twisted pair cable and includes a pair of second conductors 262, each with a second insulation 264, twisted around each other within a single second braid 266. In this embodiment, the second harness assembly 200 has two second inner contacts 250 held in the second inner housing 220, with each of the second conductors 262 connected to one of the second inner contacts 250. In other embodiments, the second cable 260 may have a single second conductor 262 with a single second insulation 264 and a single second braid 266, or may include a plurality of individual cables or shielded twisted pair cables, provided that each of the second conductors 262 is mechanically and electrically connected to one second inner contact 250 held in the second inner housing 220.

The second connection assembly 270 includes a second inner ferrule 272 disposed inside an end of the second outer contact 230 and adjacent to the second inner housing 220, as shown in FIG. 4. The second inner ferrule 272 is formed of a conductive material. The second conductor 262 and the second insulation 264 of the second cable 260 extend through the second inner ferrule 272 along the longitudinal direction L. The second braid 266 is positioned on an exterior of the second inner ferrule 272 outside of the second outer contact 230 and is electrically connected to the second inner ferrule 272.

In another embodiment, the element 200 matable with the first harness assembly 100 has the second terminal assembly 210, but has a printed circuit board instead of the second outer housing 240. The second terminal assembly 210 is disposed in the printed circuit board as described above with respect to the second outer housing 240 and has the second inner contacts 250 as described above, with the printed circuit board functioning similarly to the second mating wall 244 of the second outer housing 240 as described below. The embodiment with the printed circuit board does not have the second cable 260 or the second connection assembly 270. In this embodiment, the element 200 is referred to as a mating assembly 200 or a header 200 matable with the harness assembly 100.

The mating of the first harness assembly 100 and the second harness assembly 200 of the connector system 10 will now be described in greater detail primarily with reference to FIGS. 5-10. In the following FIGS. 5-8 and 10, the inner contacts 170, 250, the cables 180, 260, and the connection assemblies 190, 270 are omitted for clarity of the drawings and for simplicity in the explanation of the positions of the first harness assembly 100 and the second harness assembly 200 during mating. The connections between the inner contacts 170, 250, the cables 180, 260, and the connection assemblies 190, 270 formed by the mating will be described with reference to FIG. 9.

In the shown embodiment, the first harness assembly 100 has the first outer housing 150 formed as a plug and the first inner contact 170 formed as a socket, while the second harness assembly 200 has the second outer housing 240 formed as a receptacle matable with the plug of the first outer housing 150 and the second inner contact 250 formed as a pin matable with the socket of the first inner contact 170. In other embodiments, the first outer housing 150 could be the receptacle and the second outer housing 240 could be the plug, and the first inner contact 170 could be the pin and the second inner contact 250 could be the socket.

In the following, a sub-assembly of the connector system 10 including the first terminal assembly 110, the sleeve 140, and the second terminal assembly 210 will be referred to as a terminal system 20.

The first harness assembly 100 starts with the sleeve 140 in the insertion position I shown in FIG. 2. From an unmated position of the connector system 10 and the terminal system 20, the first harness assembly 100 is inserted into the receiving space 246 of the second outer housing 240 along the longitudinal direction L. The longitudinal direction L may also be referred to as the insertion direction herein.

Figure 6:
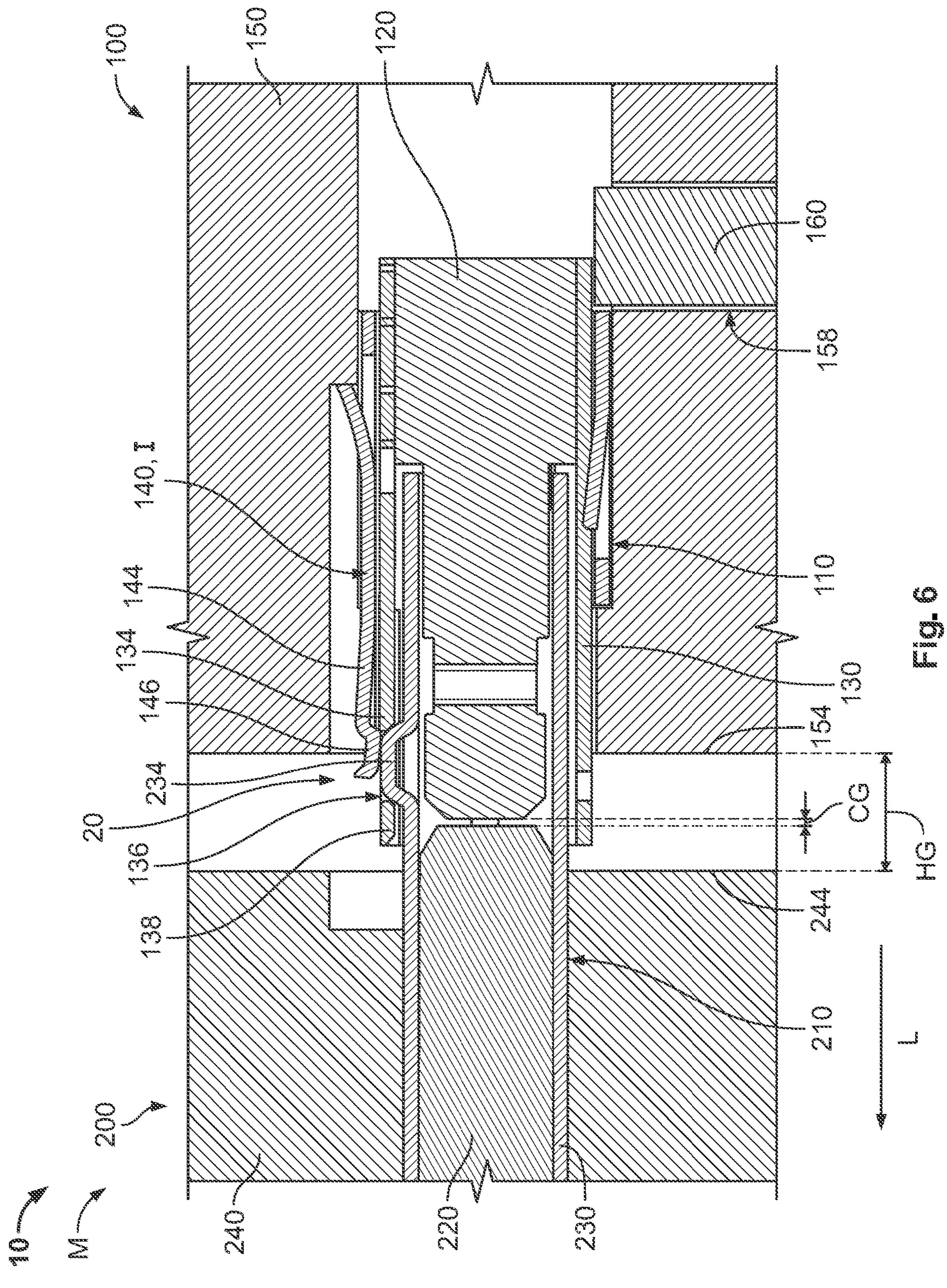
FIG. 6 is a sectional schematic detail of the first terminal assembly and the second terminal assembly in a mated position with the sleeve in the insertion position.

As shown in FIG. 5, as the first harness assembly 100 is inserted along the longitudinal direction L, the free end 138 of the outer contact beam 134 first contacts the first slope 236 of the protrusion 234 and begins to deflect as it moves along the first slope 236. The free end 138 of the outer contact beam 134 moves over the central section 237 of the protrusion 234 and the outer contact beam 134 remains deflected as the first harness assembly 100 continues to be inserted along the longitudinal direction L. As shown in FIG. 6, the outer contact beam 134 resiliently returns to an undeflected position when it reaches the second slope 238 of the protrusion 234.

The first terminal assembly 110 and the second terminal assembly 210 of the terminal system 20 are shown in a mated position M in FIG. 6. In the mated position M of the terminal system 20, when the outer contact beam 134 has resiliently returned to the undeflected position, the protrusion 234 extends through the engagement passageway 136 and engages the outer contact beam 134. In the mated position M, the first inner housing 120 is positioned separated from the second inner housing 220 by a connector interface gap CG along the longitudinal direction L. The first inner housing 120 is held at the connector interface gap CG with respect to the second inner housing 220 by engagement of the protrusion 234 with the engagement passageway 136 of the outer contact beam 134.

Figure 9:
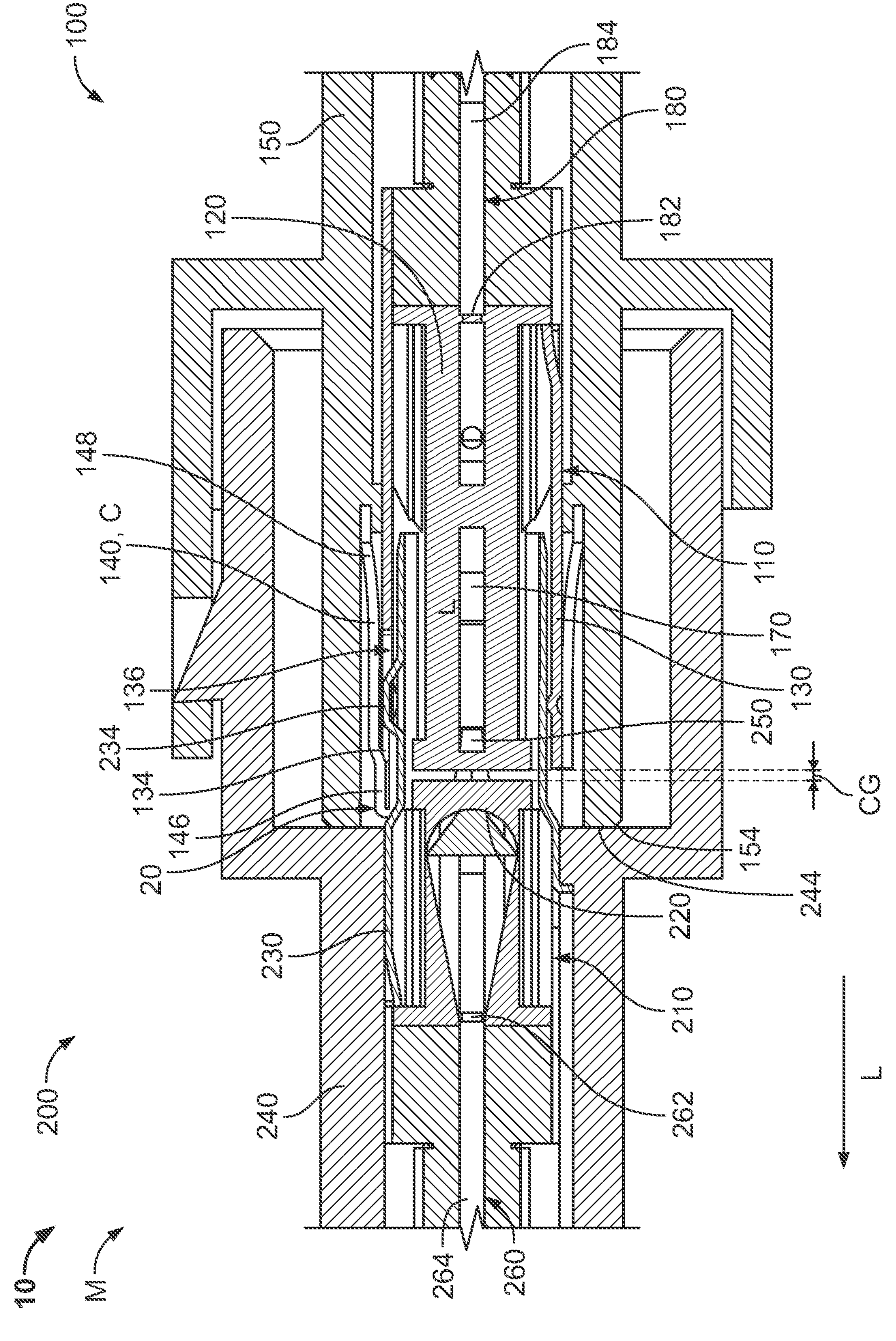
FIG. 9 is a sectional side view of the connector system with the sleeve in the end position and the first terminal assembly and the second terminal assembly in the mated position.

The first inner contact 170 is mated and electrically connected with the second inner contact 250 in the mated position M while the inner housings 120, 220 are disposed at the connector interface gap CG, as shown in FIG. 9, electrically connecting the first cable 180 with the second cable 260. In an embodiment, the first outer contact 130 is electrically connected with the second outer contact 230 in the mated position M of the terminal system 20, providing an electromagnetic shield and electrically connecting the braids 186, 266 of the cables 180, 260.

When the first terminal assembly 110 and the second terminal assembly 210 of the terminal system 20 reach the mated position M shown in FIG. 6, the protrusion 234 abuts the catch 146 and deflects the sleeve beam 144 out of the engagement passageway 136. The sleeve 140 remains in the insertion position I but, by deflection of the catch 146 out of the engagement passageway 136, the sleeve 140 is no longer fixed to the first outer contact 130 along the longitudinal direction L. In the insertion position I, the first mating end 154 of the first outer housing 150 is separated from the second mating wall 244 of the second outer housing 240 by a housing gap HG along the longitudinal direction L.

With the catch 146 disengaged from the engagement passageway 136, the sleeve 140 is free to move further along the longitudinal direction L with respect to the first terminal assembly 110 toward the second harness assembly 200. In an embodiment, the sleeve 140 could be spring loaded to be biased toward the end position C when the catch 146 is released from engagement with the engagement passageway 136.

Figure 7:
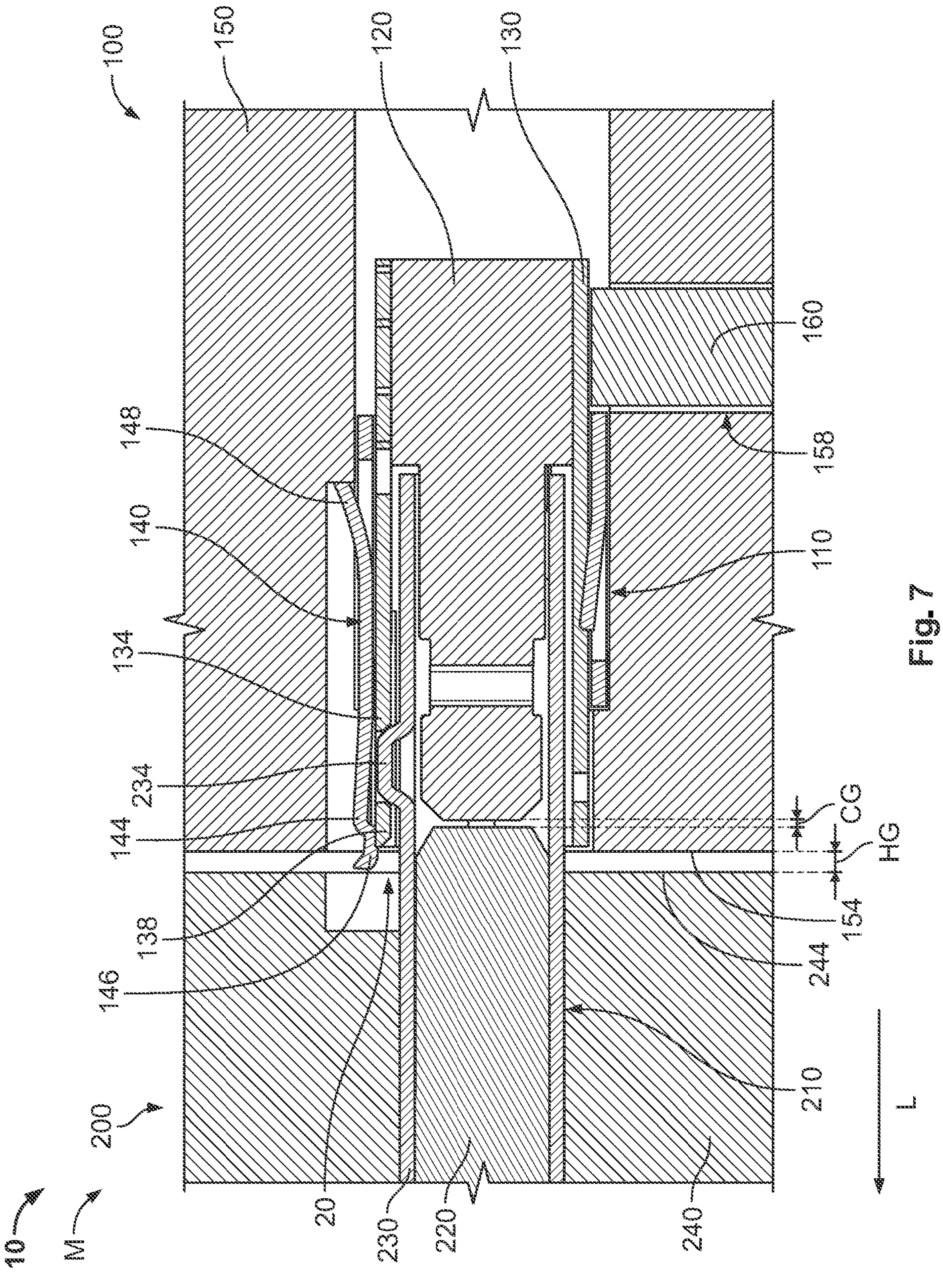
FIG. 7 is a sectional schematic detail of the sleeve moving from the insertion position to an end position with the first terminal assembly and the second terminal assembly in the mated position.
Figure 8:
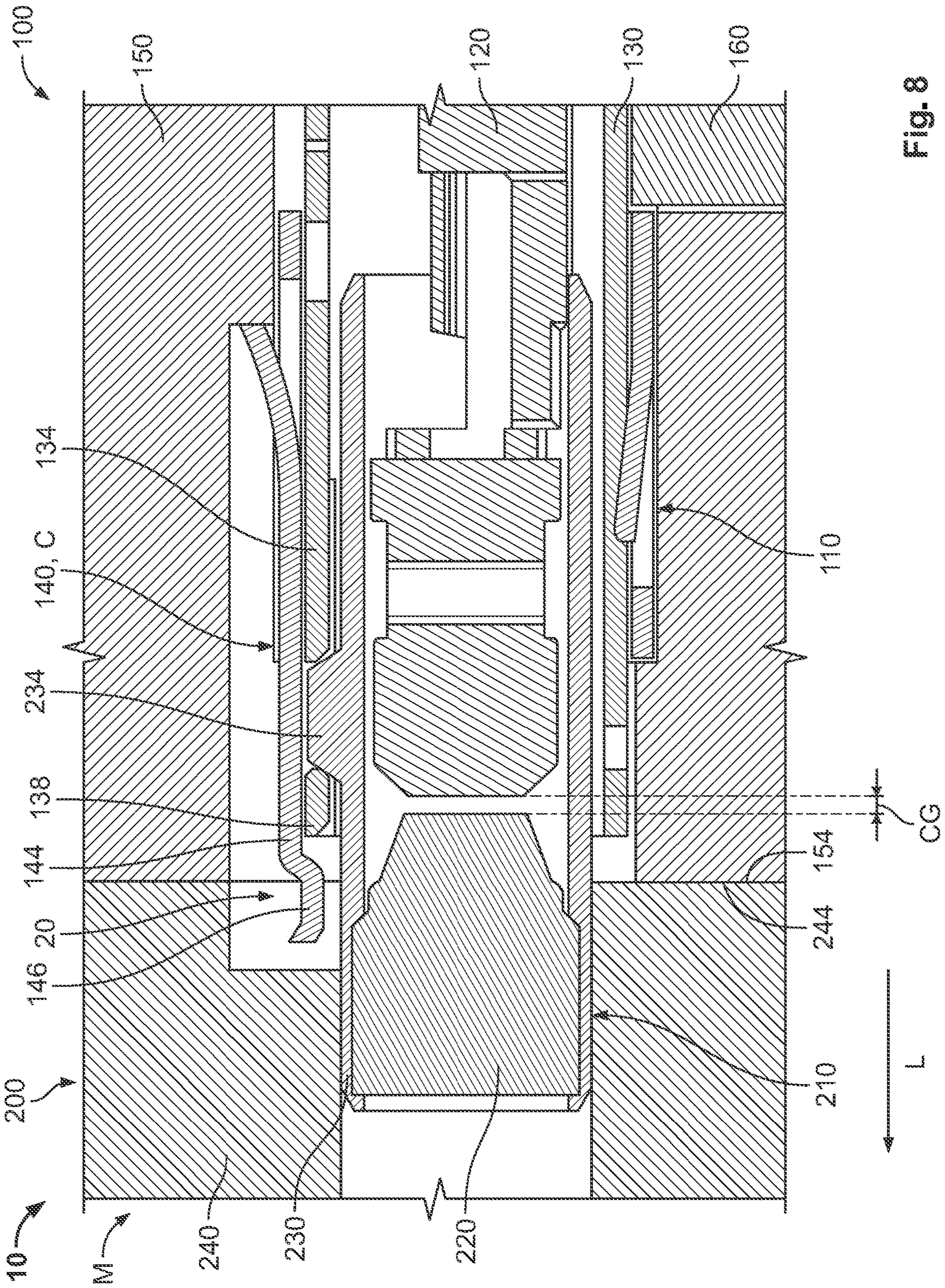
FIG. 8 is a sectional schematic detail of the sleeve in the end position and the first terminal assembly and the second terminal assembly in the mated position.

The first outer housing 150 is connected to the sleeve 140 by the latching arm 148 and is not connected to the first terminal assembly 110; the first outer housing 150 moves with the sleeve 140 with respect to the first terminal assembly 110 along the longitudinal direction L. As shown in FIGS. 7 and 8, the first terminal assembly 110 and the second terminal assembly 210 remain in the mated position M, and the first inner housing 120 remains at the connector interface gap CG with respect to the second inner housing 220, while the sleeve 140 and the first outer housing 150 move toward the second harness assembly 200 along the longitudinal direction L.

The catch 146 moves along the outer contact beam 134 as shown in FIG. 7 until it reaches the free end 138, when the sleeve beam 144 elastically restores to engage the free end 138 in the embodiment shown in FIG. 8. In another embodiment, the catch 146 and the sleeve beam 144 can remain deflected in the position shown in FIG. 8 and do not elastically restore to engage the free end 138.

The first harness assembly 100 and the second harness assembly 200 are shown in an end position C of the sleeve 140 in FIGS. 8 and 9. As the sleeve 140 moves from the insertion position Ito the end position C, the first outer housing 150 moves toward the second outer housing 240 along the longitudinal direction L, decreasing and closing the housing gap HG. In the end position C, in which the sleeve beam 144 is no longer deflected and the catch 146 is disposed beyond the free end 138 of the outer contact beam 134 in the longitudinal direction L, the first mating end 154 of the first outer housing 150 abuts the second mating wall 244 of the second outer hosing 240, minimizing the housing gap HG in the mated position M. In another embodiment, the catch 146 and the sleeve beam 144 remain deflected in the end position C while the housing gap HG is minimized.

The first terminal assembly 110 and the second terminal assembly 210 of the terminal system 20 remain stationary in the mated position M, and the first inner housing 120 remains at the connector interface gap CG with respect to the second inner housing 220, when the sleeve 140 is in the end position C. The sleeve 140 inhibits deflection of the outer contact beam 134 out of engagement with the protrusion 234 while the sleeve 140 is in the end position C, maintaining the first terminal assembly 110 and the second terminal assembly 210 in the mated position M.

From the end position C shown in FIGS. 8 and 9, the sleeve 140 can be moved back toward the insertion position I. When the first harness assembly 100 is moved away from the second harness assembly 200 along the longitudinal direction L, the catch 146 is deflected over the free end 138 of the outer contact beam 138, as shown in FIG. 7. The housing gap HG is widened along the longitudinal direction L while the first terminal assembly 110 and the second terminal assembly 210 remain in the mated position M and the first inner housing 120 remains at the connector interface gap CG with respect to the second inner housing 220.

Figure 10:
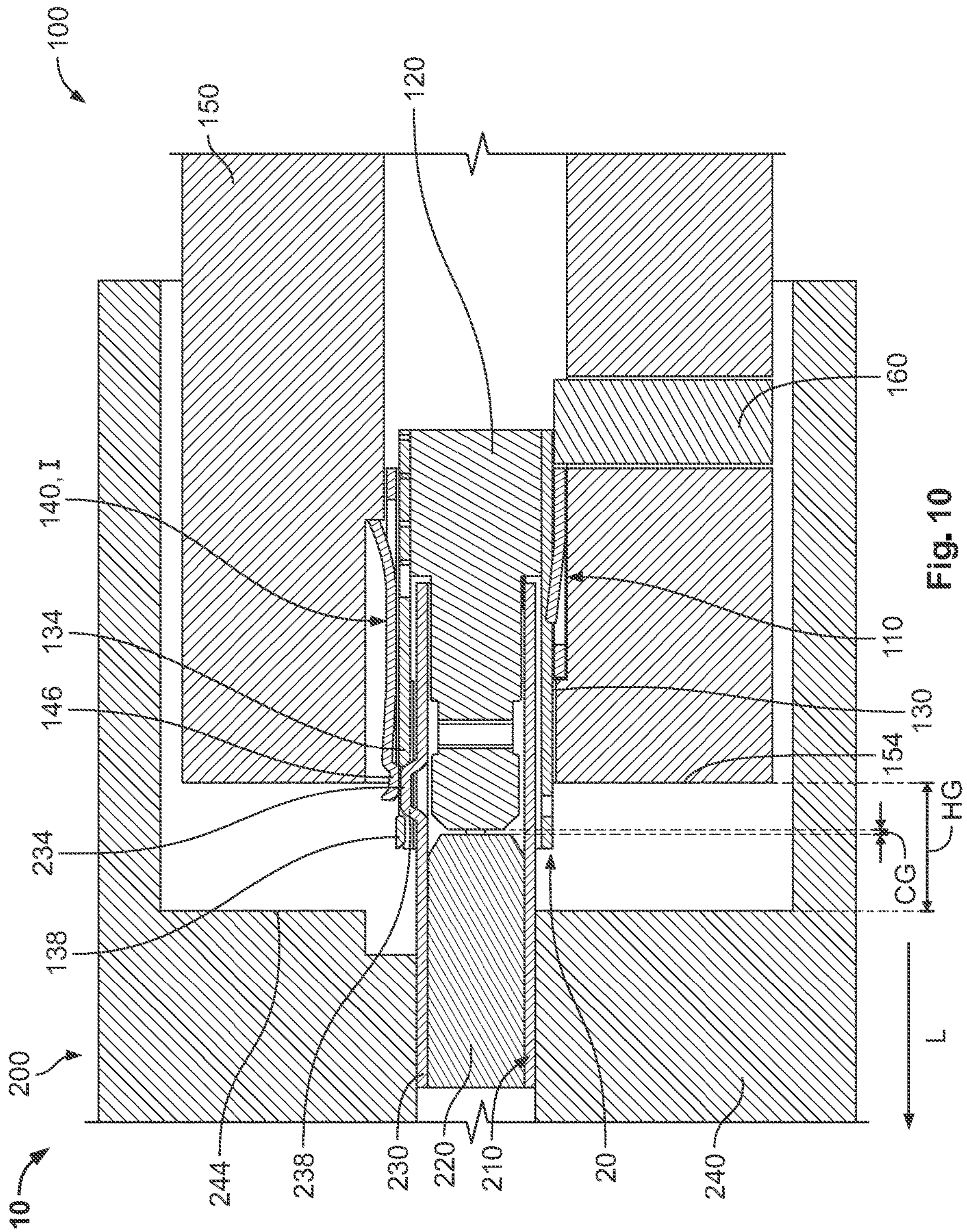
FIG. 10 is a sectional schematic detail of the sleeve in the insertion position during unmating of the first terminal assembly and the second terminal assembly.

When the catch 146 reaches the position shown in FIG. 10, in the insertion position I of the sleeve 140, deflection of the outer contact beam 134 is no longer inhibited by the sleeve 140, and the free end 138 of the outer contact beam 134 can deflect while moving along the second slope 238 of the protrusion 234. The outer contact beam 134 is movable out of engagement with the protrusion 234 while the sleeve 140 is in the insertion position I, permitting unmating of the first terminal assembly 110 and the second terminal assembly 210 and removal of the first harness assembly 100 from the second harness assembly 200.

Figure 11:
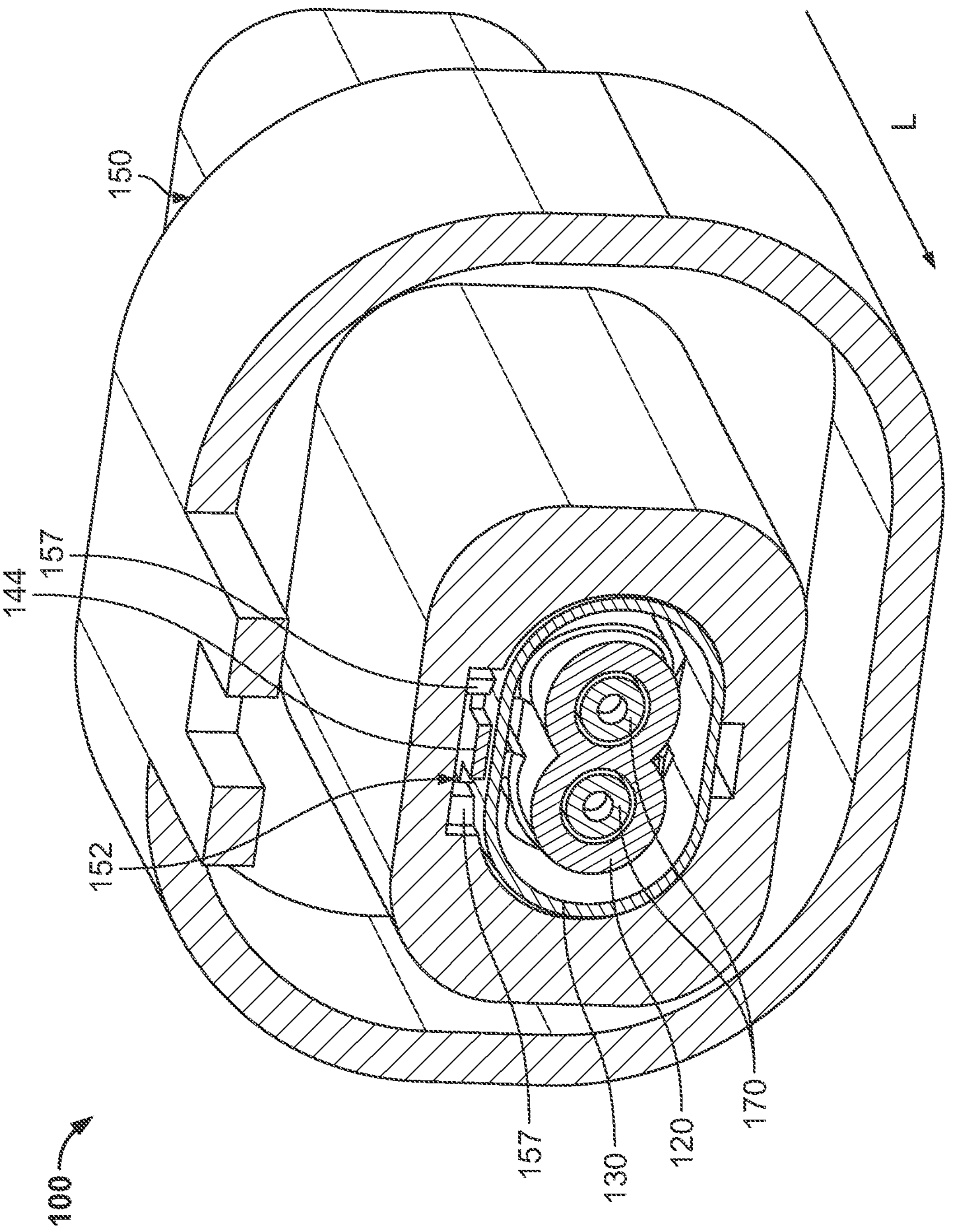
FIG. 11 is a sectional perspective view of a first harness assembly according to another embodiment.
Figure 12:
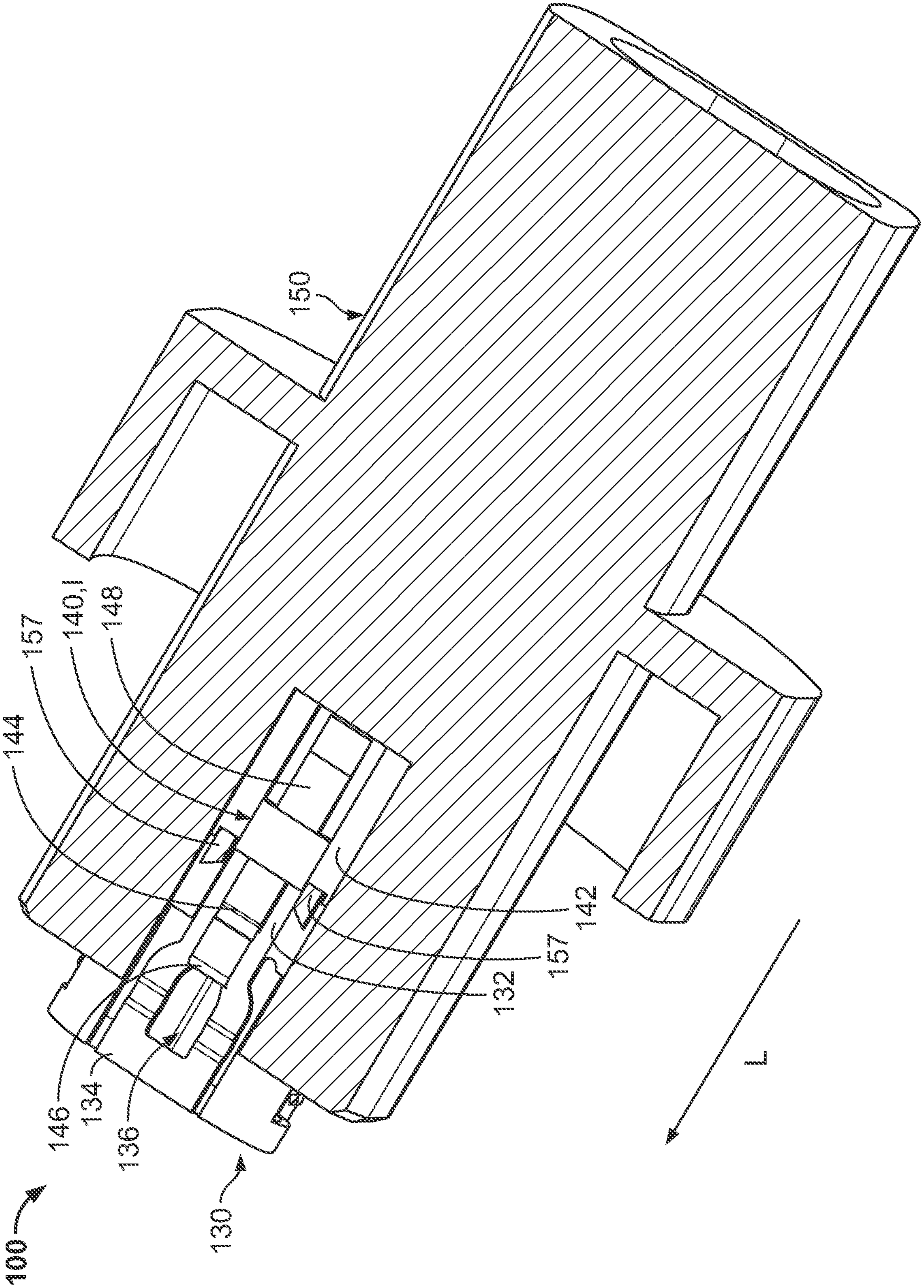
FIG. 12 is a sectional perspective view of the first harness assembly of FIG. 11 with a sleeve in an insertion position.
Figure 13:
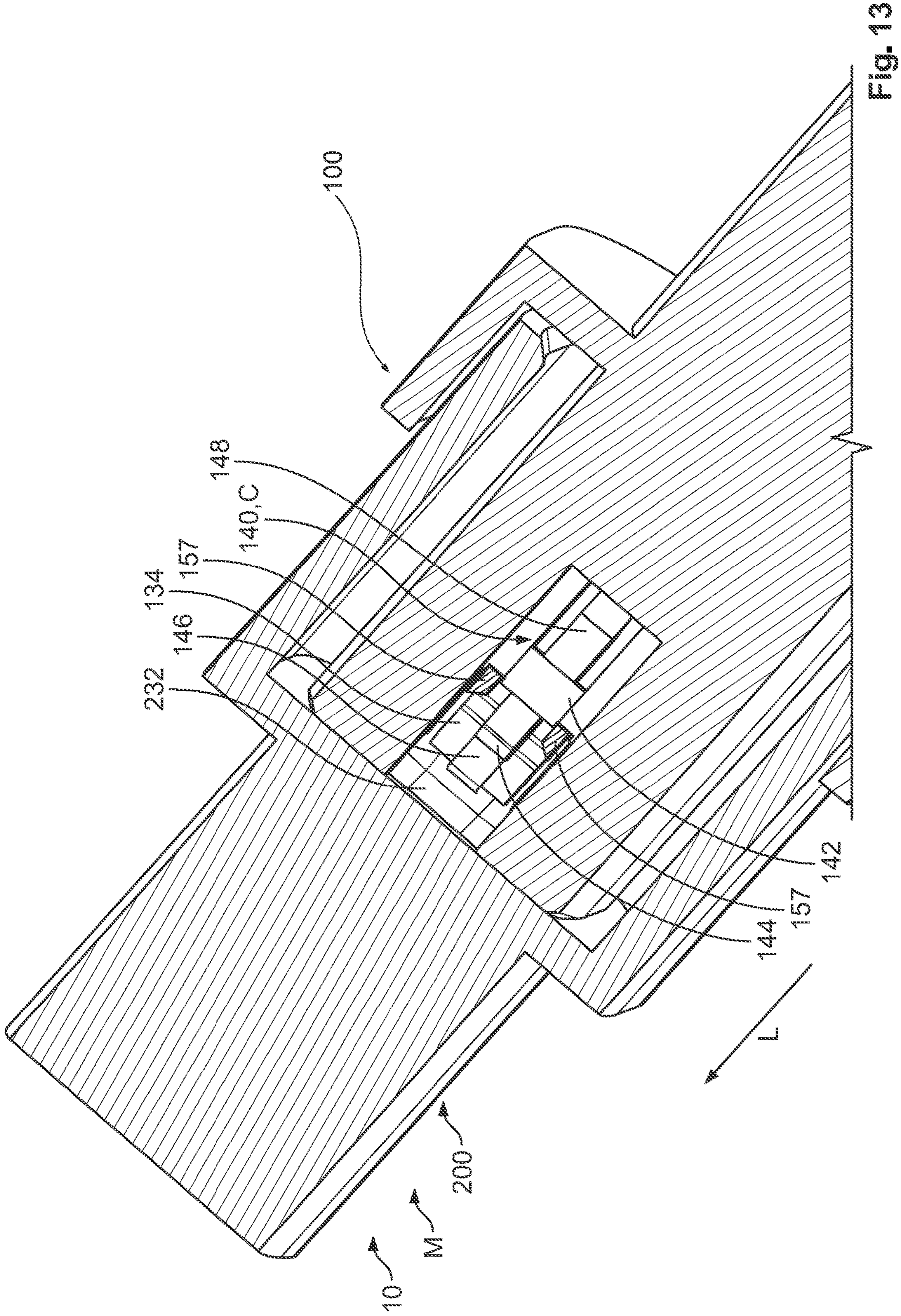
FIG. 13 is a sectional perspective view of the first harness assembly of FIG. 11 mated with a second harness assembly and the sleeve in an end position.

A first harness assembly 100 of a connector system 10 according to another embodiment is shown in FIGS. 11-13. Like reference numbers refer to like elements in comparison with the embodiments described above and primarily the differences of the embodiment shown in FIGS. 11-13 will be described in detail herein.

As shown in FIG. 11, the first outer housing 150 has a pair of posts 157 protruding from an upper inner surface of the first outer housing 150 and extending into first terminal assembly passageway 152. The posts 157 are separated from one another along a direction perpendicular to the longitudinal direction L. The posts 157 are formed from a same material as the first outer housing 150 and, in the shown embodiment, the posts 157 are integrally formed in a single piece with the first outer housing 150. In another embodiment, the posts 157 can be formed separately from the first outer housing 150 and attached to the first outer housing 150. Although two posts 157 are depicted in the shown embodiment, in other embodiments, the first outer housing 150 can have one post 157 or three or more posts 157, provided the posts 157 can perform the function described below.

The first harness assembly 100 is shown in FIG. 12 with the sleeve 140 in the insertion position I and prior to mating with the second harness assembly 200. In the position shown in FIG. 12, the posts 157 abut on the first outer contact body 132 of the first outer contact 130. The posts 157 in this position are spaced apart from the outer contact beam 134 along the longitudinal direction L and do not prevent or limit deflection of the outer contact beam 134.

When the first harness assembly 100 is mated with the second harness assembly 200 of the connector system 10, as shown in FIG. 13, the sleeve 140 and the first outer housing 150 have moved with respect to the first terminal assembly 110 toward the second harness assembly 200 along the longitudinal direction L. In the embodiment shown in FIGS. 11-13, when the sleeve 140 reaches the end position C as shown in FIG. 13, the posts 157 have moved with the first outer housing 150 along the longitudinal direction L and are positioned in abutment with the outer contact beam 134. The posts 157 limit or inhibit deflection of the outer contact beam 134 in the end position C of the sleeve 140 and the mated position M.

The posts 157 of the first outer housing 150 in the embodiment of FIGS. 11-13 permit the outer contact beam 134 to resiliently deflect over the protrusion 234, while moving over the outer contact beam 134 in the end position C to provide support inhibiting deflection of the outer contact beam 134 out of engagement with the protrusion 234, maintaining the first terminal assembly 110 and the second terminal assembly 210 in the mated position M. The reinforcement provided by the posts 157 to limit or inhibit deflection of the outer contact beam 134 can be in lieu of or in addition to the deflection limiting provided by the sleeve 140 described above.

In the terminal system 20 and connector system 10 according to the embodiments described herein, when the first terminal assembly 110 and the second terminal assembly 210 reach the mated position M with the connector interface gap CG, the sleeve 140 allows further movement of the first outer housing 150 with respect to the second outer housing 240 while the first terminal assembly 110 and the second terminal assembly 210 remain mated and spaced by the connector interface gap CG. Assembly tolerances of the outer housings 150, 240, through movement of the sleeve 140 with respect to the first terminal assembly 110, are therefore independent of and do not affect the connector interface gap CG. The connector interface gap CG is thus dictated by fewer tolerances than in known arrangements and is easier to keep below the small tolerance allowance for optical performance of the terminal system 20 and the connector system 10. The connector interface gap CG depicted in the shown embodiment is merely exemplary; the connector interface gap CG could be smaller or larger than shown, or could be zero, provided that the connector interface gap CG is within a predetermined tolerance allowance.

What is claimed is:

1. A terminal system, comprising:

a first terminal assembly including a first inner housing and a first outer contact disposed around the first inner housing, the first outer contact has a first outer contact body and an outer contact beam resiliently deflectable with respect to the first outer contact body;

a sleeve disposed around the first outer contact of the first terminal assembly; and a second terminal assembly matable with the first terminal assembly along a longitudinal direction, the sleeve is movable with respect to the first terminal assembly from an insertion position to an end position along the longitudinal direction toward the second terminal assembly while the first terminal assembly remains stationary in a mated position with the second terminal assembly.

2. The terminal system of claim 1, wherein the sleeve has a sleeve body and a sleeve beam resiliently deflectable with respect to the sleeve body.

3. The terminal system of claim 2, wherein the sleeve has a catch disposed on an end of the sleeve beam, the catch is engaged in an engagement passageway of the outer contact beam in the insertion position.

4. The terminal system of claim 3, wherein the sleeve is fixed to the first outer contact when the first terminal assembly and the second terminal assembly are not in the mated position.

5. The terminal system of claim 3, wherein the second terminal assembly includes a second inner housing and a second outer contact disposed around the second inner housing, the second inner housing is separated from the first inner housing by a connector interface gap in both the insertion position and the end position.

6. The terminal system of claim 5, wherein the second outer contact has a protrusion, the outer contact beam deflects from contact with the protrusion during insertion of the first terminal assembly toward the second terminal assembly along the longitudinal direction.

7. The terminal system of claim 6, wherein the protrusion is engaged in the engagement passageway of the outer contact beam in the mated position.

8. The terminal system of claim 6, wherein the protrusion deflects the sleeve beam out of the engagement passageway in the insertion position.

9. The terminal system of claim 8, wherein the outer contact beam is movable out of engagement with the protrusion while the sleeve is in the insertion position.

10. The terminal system of claim 7, wherein the sleeve inhibits deflection of the outer contact beam out of engagement with the protrusion while the sleeve is in the end position.

11. The terminal system of claim 3, wherein the catch in the end position is disposed beyond a free end of the outer contact beam in the longitudinal direction.

12. The terminal system of claim 2, wherein the sleeve beam is deflected in the end position.

13. A connector system, comprising:

a first harness assembly having a first terminal assembly and a sleeve disposed around the first terminal assembly, the first harness assembly has a first outer housing within which the first terminal assembly and the sleeve are disposed; and a second harness assembly having a second terminal assembly matable with the first terminal assembly along a longitudinal direction, the sleeve is movable with respect to the first terminal assembly from an insertion position to an end position along the longitudinal direction toward the second harness assembly while the first terminal assembly remains stationary in a mated position with the second terminal assembly.

14. The connector system of claim 13, wherein the sleeve is attached to the first outer housing and the first outer housing is movable with the sleeve between the insertion position and the end position with respect to the first terminal assembly.

15. The connector system of claim 13, wherein the first harness assembly has a secondary lock securing the sleeve in the first outer housing.

16. The connector system of claim 14, wherein the second harness assembly has a second outer housing within which the second terminal assembly is disposed, the second terminal assembly is fixed in the second outer housing.

17. The connector system of claim 16, wherein the first outer housing moves toward the second outer housing between the insertion position and the end position and decreases a housing gap between the first outer housing and the second outer housing along the longitudinal direction.

18. The connector system of claim 14, wherein the first outer housing has a post abutting a first outer contact of the first terminal assembly.

19. The connector system of claim 18, wherein the first outer contact has a first outer contact body and an outer contact beam resiliently deflectable with respect to the first outer contact body, the post abuts the outer contact beam and limits deflection of the outer contact beam in the end position of the sleeve.

20. A connector system, comprising:

a harness assembly having a first terminal assembly and a sleeve disposed around the first terminal assembly, the first terminal assembly has a first outer contact with an outer contact beam that is resiliently deflectable, the sleeve has a sleeve beam that is resiliently deflectable; and a mating assembly having a second terminal assembly matable with the first terminal assembly along a longitudinal direction, the sleeve is movable with respect to the first terminal assembly from an insertion position to an end position along the longitudinal direction toward the mating assembly while the first terminal assembly remains stationary in a mated position with the second terminal assembly, the sleeve beam inhibits deflection of the outer contact beam in the end position.

* * * * *